(12) United States Patent
Knapp et al.

(10) Patent No.: US 12,291,401 B2
(45) Date of Patent: May 6, 2025

(54) DEFLECTING DEVICE FOR AN ELONGATE ITEM

(71) Applicant: SPRINGER MASCHINENFABRIK GMBH, Friesach (AT)

(72) Inventors: Florian Knapp, St. Blasen (AT); Julian Pötscher, St. Veit an der Glan (AT)

(73) Assignee: SPRINGER MASCHINENFABRIK GMBH, Friesach (AT)

( * ) Notice: Subject to any disclaimer, the term of this patent is extended or adjusted under 35 U.S.C. 154(b) by 0 days.

(21) Appl. No.: 18/702,895

(22) PCT Filed: Oct. 13, 2022

(86) PCT No.: PCT/EP2022/078487
§ 371 (c)(1),
(2) Date: Apr. 19, 2024

(87) PCT Pub. No.: WO2023/066779
PCT Pub. Date: Apr. 27, 2023

(65) Prior Publication Data
US 2024/0327133 A1    Oct. 3, 2024

(30) Foreign Application Priority Data

Oct. 20, 2021  (AT) .............................. A 50834/2021
Oct. 20, 2021  (AT) .............................. A 50835/2021
Feb. 25, 2022  (AT) .............................. A 50126/2022

(51) Int. Cl.
*B65G 15/14*    (2006.01)
*B65G 15/12*    (2006.01)
(Continued)

(52) U.S. Cl.
CPC ............ *B65G 17/002* (2013.01); *B65G 15/12* (2013.01); *B65G 15/14* (2013.01); *B65G 17/36* (2013.01);
(Continued)

(58) Field of Classification Search
CPC ...... B65G 15/12; B65G 47/46; B65G 41/002; B65G 47/82; B65G 2201/0217;
(Continued)

(56) References Cited

U.S. PATENT DOCUMENTS 3,890,011 A  *  6/1975  Futer .................... B65G 51/03
                                                          406/88
3,960,267 A     6/1976  Valo
(Continued)

FOREIGN PATENT DOCUMENTS

AT       343539 B    6/1978
DE     2014857 A1    3/1971
(Continued)

OTHER PUBLICATIONS

Austria Application No. A 50835/2021, Office Action mailed Jul. 7, 2022, 2 pages.
(Continued)

*Primary Examiner* — Gene O Crawford
*Assistant Examiner* — Lester Ill Rushin
(74) *Attorney, Agent, or Firm* — Liang & Hennessey LLP; Brian Hennessey

(57) ABSTRACT

A deflecting device for an elongate item, wherein the deflecting device has a receiving region, and wherein the receiving region is designed to receive the elongate item in cross transport on the input side and to discharge the elongate item in longitudinal transport on the output side. The deflecting device includes at least two belt-type conveyors in the longitudinal transport direction which are arranged at an angle relative to one another, wherein the at least two belt-type conveyors span the receiving region when the deflecting device is in an operating state.

19 Claims, 6 Drawing Sheets

(51) Int. Cl.
  *B65G 17/00* (2006.01)
  *B65G 17/36* (2006.01)
  *B65G 21/02* (2006.01)
  *B65G 21/22* (2006.01)
  *B65G 41/00* (2006.01)
  *B65G 45/10* (2006.01)
  *B65G 47/46* (2006.01)
  *B65G 47/82* (2006.01)

(52) U.S. Cl.
  CPC ............ *B65G 21/02* (2013.01); *B65G 21/22* (2013.01); *B65G 41/002* (2013.01); *B65G 45/10* (2013.01); *B65G 47/46* (2013.01); *B65G 47/82* (2013.01); *B65G 2201/0217* (2013.01); *B65G 2201/0282* (2013.01)

(58) Field of Classification Search
  CPC .......... B65G 2201/0282; B65G 17/002; B65G 15/14; B65G 17/36; B65G 21/02; B65G 21/22; B65G 45/10
  USPC ........................................................ 198/890
  See application file for complete search history.

(56) References Cited

U.S. PATENT DOCUMENTS 4,889,224 A  12/1989 Denker
9,079,721 B2 * 7/2015 Kawanishi ............ B65G 43/08

FOREIGN PATENT DOCUMENTS

| | | | |
|---|---|---|---|
| DE | 2935813 | A1 | 3/1981 |
| DE | 3024699 | A1 | 1/1982 |
| DE | 3633036 | A1 | 3/1988 |
| DE | 102017006620 | A  * | 1/2019 |
| DE | 102017006620 | A1 * | 1/2019 |
| DE | 102020129757 | A1 * | 5/2022 |
| EP | 1873089 | A2 | 1/2008 |
| EP | 2058093 | A2 | 5/2009 |
| WO | WO2017185192 |  * | 11/2017 |

OTHER PUBLICATIONS

International Application No. PCT/EP2022/078487, International Search Report and Written Opinion mailed Feb. 7, 2023, 22 pages.
International Application No. PCT/EP2022/078487, International Preliminary Report mailed Apr. 17, 2023, 33 pages.

* cited by examiner

DEFLECTING DEVICE FOR AN ELONGATE ITEM

CROSS-REFERENCE TO RELATED APPLICATIONS

The present application is a national phase application of PCT Application No. PCT/EP2022/078487, filed Oct. 13, 2022, entitled "DEFLECTING DEVICE FOR AN ELONGATE ITEM", which claims the benefit of Austrian Patent Application Nos. A 50834/2021, filed Oct. 20, 2021, A 50835/2021, filed Oct. 20, 2021, and A 50126/2022, filed Feb. 25, 2022, each of which is incorporated by reference in its entirety.

BACKGROUND OF THE INVENTION

1. Field of the Invention

The invention relates to a deflecting device for an elongate item.

2. Description of the Related Art

It is known to convey an elongate item in cross transport as well as in longitudinal transport. Such conveying devices are usually arranged in succession, enabling the elongate item to be diverted from the cross transport to the longitudinal transport or vice versa.

Furthermore, it is known that conventional sorting systems, in particular round wood sorting systems, differ in their designs on account of the conditions of the installation sites and the needs of the customers. Sorting systems usually comprise a receiving unit for transferring the elongate item from the cross transport to the longitudinal transport, as well as a longitudinal sorting line that is arranged adjacent to the receiving unit.

The disadvantage of currently known sorting systems is that when elongate items are transferred from the cross transport to the longitudinal transport using a conventional receiving unit, gaps of different sizes arise between the elongate items on the longitudinal transporters. In one common conveying process, these gaps between the elongate items are subsequently detected in the longitudinal sorting line using sensors, and an attempt is made to obtain a uniformly sized gap by adjusting the conveying speed.

SUMMARY OF THE INVENTION

It is therefore the object of the invention to provide a deflecting device of the type mentioned at the outset with which the above mentioned disadvantages can be avoided and with which an environmentally friendly and harmonized transfer of elongate items from the cross transport to the longitudinal transport is achieved.

The present technology provides the advantage that an elongate item or elongate items can be transferred from the cross transport to the longitudinal transport in such a way that the gap between the elongate items is as uniform as possible. This significantly reduces the control complexity for standardizing the gaps between the elongate items in a longitudinal sorting line adjacent to the deflecting device. By virtue of the design and arrangement of belt-type conveyors, elongate items can be transferred from the cross transport to the longitudinal transport more quickly and in shorter time intervals between the elongate items, since the gaps between the elongate items are already formed in a substantially uniform manner when the elongate items are transferred from the cross transport to the longitudinal transport. This enables the conveying process to be accelerated significantly, especially when feeding an elongate item from one side of the deflecting device. The receiving region also provides the advantage that the gaps between elongate items of different dimensions are formed so as to be substantially uniform, since the elongate items come into contact more quickly with a larger area of the at least two belt-type conveyors during the transfer from the cross transport to the longitudinal transport. As a result, the elongate items are centered more quickly in the longitudinal transport direction and are consequently transported away from the receiving region more quickly. By virtue of the receiving region and the conveyance of the elongate items on the at least two belt-type conveyors, no leading edges are formed, either. As a result, the elongate items cannot abut against the side panels of the deflecting device, which means that the conveying speed of the elongate items is not reduced. This also advantageously prevents a pendulum movement of the elongate item when the elongate item is received from the cross transport. This effect has proven to be especially efficiency-enhancing for the conveying process, especially for shorter items. Furthermore, the formation of the receiving region by the at least two belt-type conveyors means that oil lubrication on exposed components of the deflecting device can be dispensed with. This elimination of oil lubrication means that no oil can get into the environment due to the deflecting device itself in the location in which the deflecting device is installed.

The invention further relates to a sorting system with at least one deflecting device.

Express reference is hereby made to the wording of the patent claims, whereby the patent claims are incorporated into the description at this point by reference and considered to be reproduced verbatim.

BRIEF DESCRIPTION OF THE DRAWINGS

The invention will be described in greater detail with reference to the accompanying drawings, in which only preferred embodiments are shown by way of example. Brief description of the figures.

DETAILED DESCRIPTION

Figure 1:
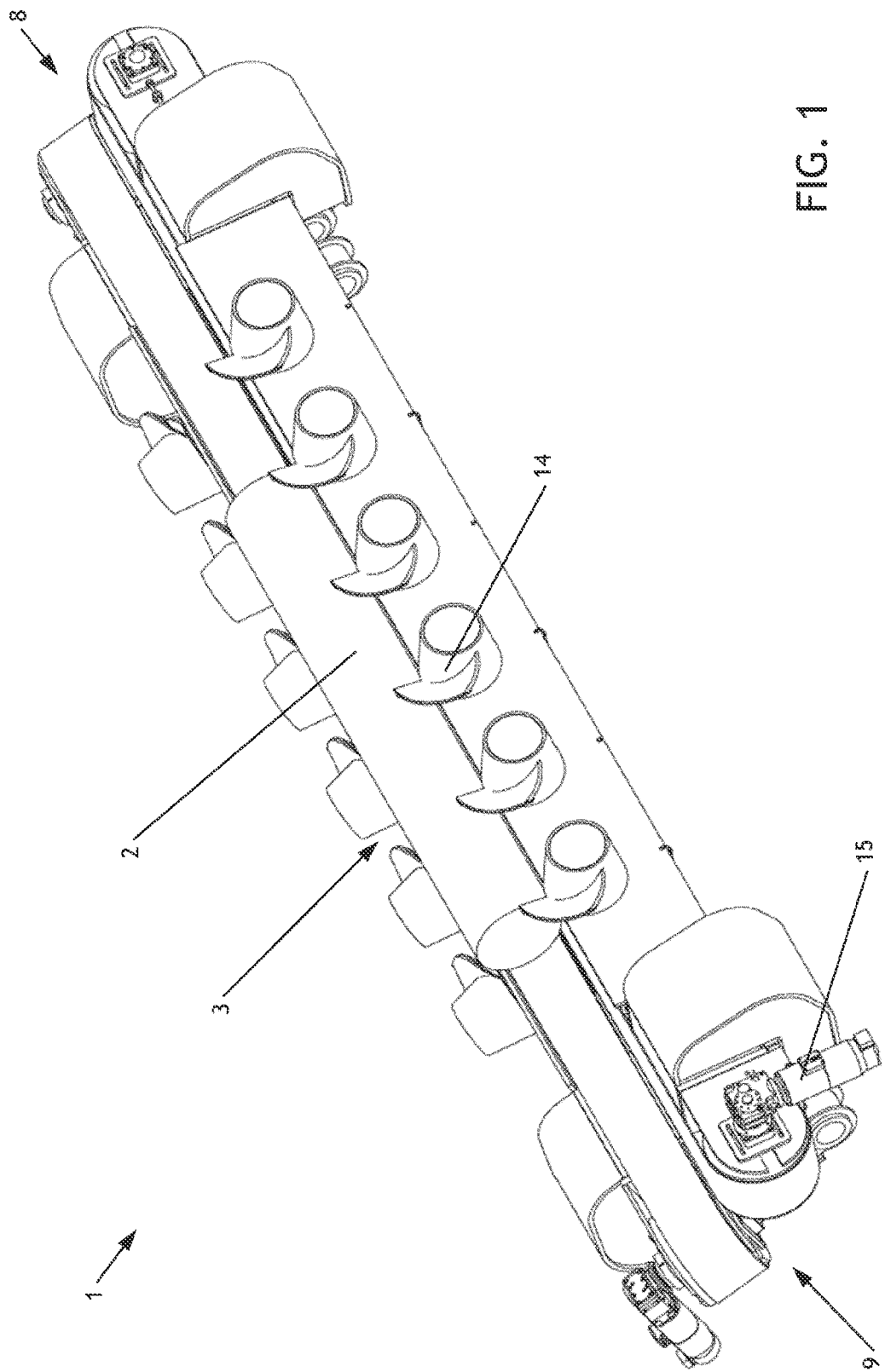
FIG. 1 shows an axonometric view of a preferred embodiment of a deflecting device for an elongate item.
Figure 2:
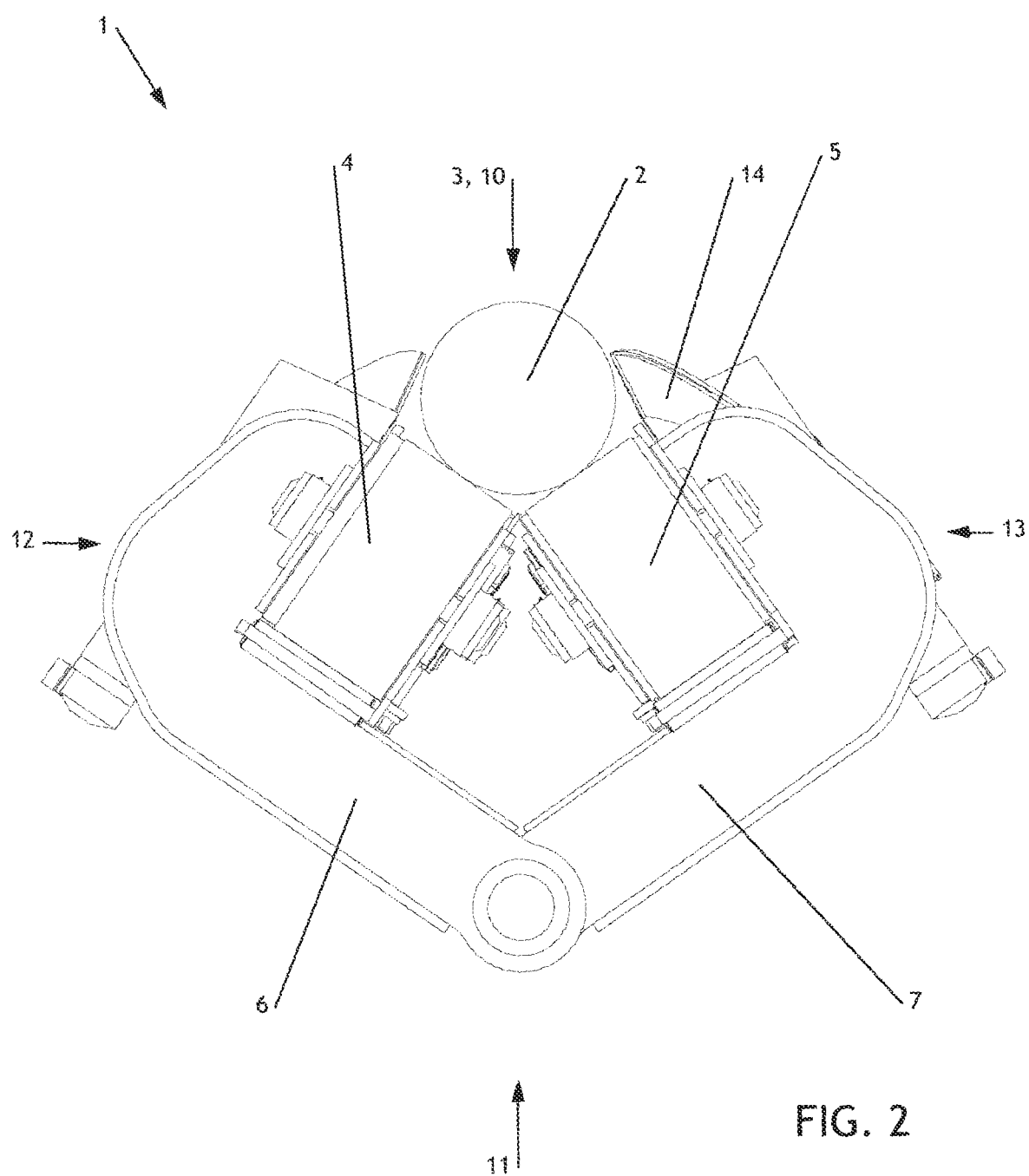
FIG. 2 shows a front view of the preferred embodiment of the deflecting device for an elongate item.
Figure 3:
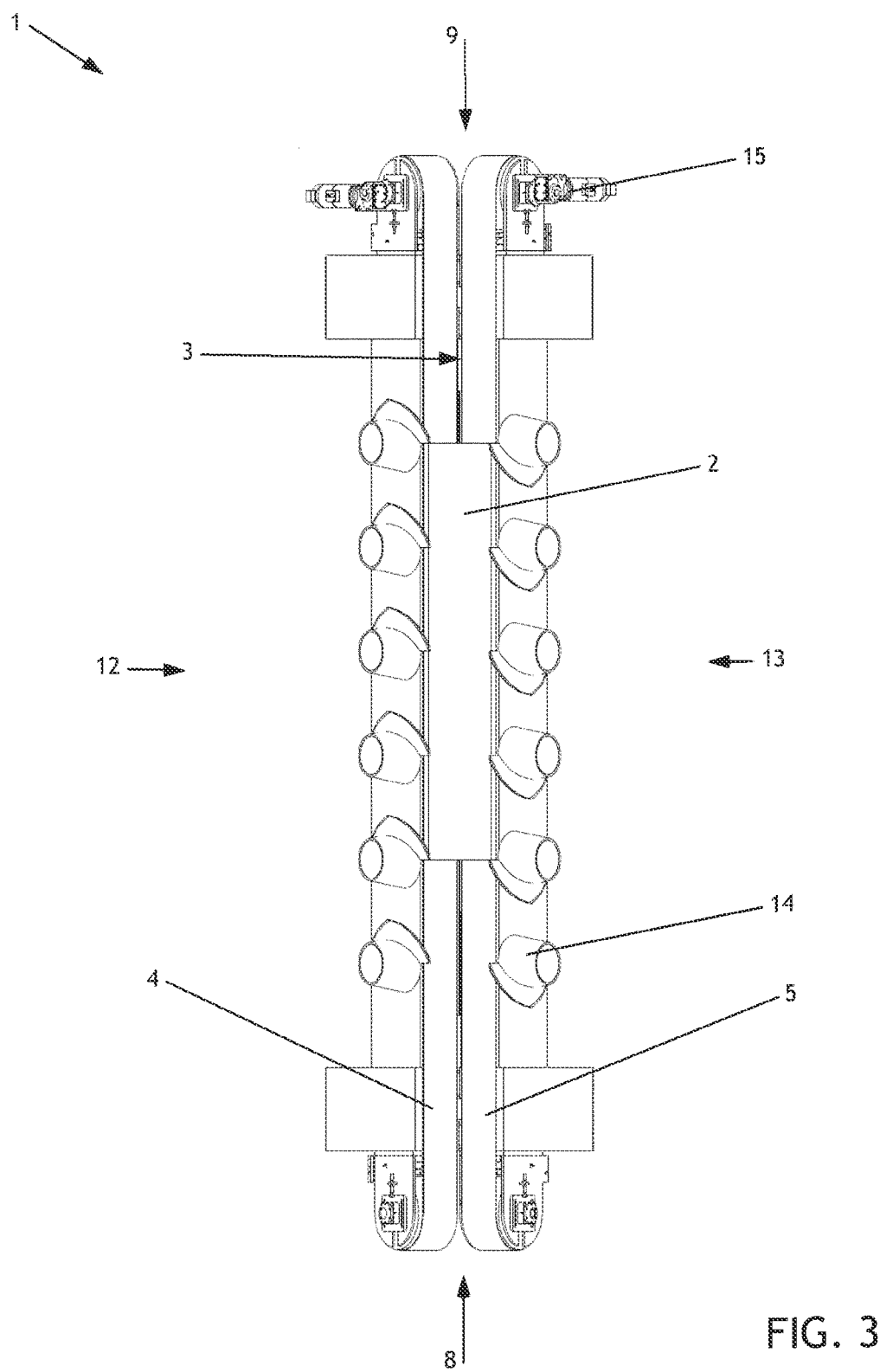
FIG. 3 shows a top view of the preferred embodiment of the deflecting device for an elongate item.

FIGS. 1 to 3 show at least portions of a preferred embodiment of a deflecting device 1 for an elongate item 2, the deflecting device 1 having a receiving region 3, the receiving region 3 being designed to receive the elongate item 2 on the input side in the cross transport and the elongate item 2 on the output side in the longitudinal transport, the deflecting device 1 comprising at least two belt-type conveyors 4, 5 which are arranged at an angle relative to one another in the longitudinal transport direction 21, the at least two belt-type conveyors 4, 5 spanning the receiving region 3 when the deflecting device 1 is in an operating state.

A sorting system with at least one deflecting device 1 is also provided.

This provides the advantage that an elongate item or elongate items 2 can be transferred from the cross transport to the longitudinal transport in such a way that the gap between the elongate items 2 is as uniform as possible. This significantly reduces the control complexity for standardizing the gaps between the elongate item 2 in a longitudinal sorting line adjoining the deflecting device 1. By virtue of the design and arrangement of the belt-type conveyors 4, 5, elongate items 2 can be transferred from the cross transport to the longitudinal transport more quickly and with shorter time intervals between the elongate items 2, since the gaps between the elongate items 2 are already formed so as to be substantially uniform when the elongate items 2 are transferred from the cross transport to the longitudinal transport. This enables the conveying process to be accelerated significantly, especially when feeding an elongate item 2 from one side of the deflecting device 1. The receiving region 3 also provides the advantage that the gaps between elongate items 2 of different dimensions are formed so as to be substantially uniform, since the elongate unit loads 2 come into contact with a larger surface of the at least two belt-shaped conveyors 4, 5 more quickly when they are transferred from the cross transport to the longitudinal transport. As a result, the elongate items 2 are centered more quickly in the longitudinal transport direction 21 and are consequently transported away from the receiving region 3 more quickly. By virtue of the receiving region 3 and the conveyance of the elongate items 2 on the at least two belt-type conveyors 4, 5, no leading edges are formed, either. As a result, the elongate items 2 cannot abut against the side panels of the deflecting device 1, which means that the conveying speed of the elongate items 2 is not reduced. This also advantageously prevents a pendulum movement of the elongate item 2 when the elongate item 2 is received from the cross transport. This effect has proven to be especially efficiency-enhancing for the conveying process, especially for shorter items 2. Furthermore, the formation of the receiving region 3 by the at least two belt-type conveyors 4, 5 means that oil lubrication on exposed components of the deflecting device 1 can be dispensed with. This elimination of oil lubrication means that no oil can get into the environment due to the deflecting device 1 itself in the location in which the deflecting device 1 is installed.

The deflecting device 1 is a device which is designed to pick up elongate items 2 on the input side in the cross transport and to deliver the elongate item 2 on the output side in the longitudinal transport.

Elongate items 2 are any type of item that has an elongate dimension. A first side of the elongate item 2 that extends along the longitudinal transport direction 21 is longer than a second side of the elongate item 2 that is arranged transversely to the longitudinal transport direction 21.

The elongate item 2 is preferably made of wood.

Alternatively, the elongate item 2 can also be made of a polymer and/or a metal.

The elongate item 2 preferably comprises boards, slats, strips, and/or beams.

Especially preferably, the elongate item 2 comprises wooden boards, wooden slats, wooden strips, wooden beams, and/or round timbers.

Cross transport is preferably understood to mean transport of the elongate item 2 in the direction orthogonal to the longitudinal transport direction 21 of the elongate item 2.

Longitudinal transport is preferably understood to mean transport of the elongate item 2 in the direction of the longitudinal extent of the elongate item 2.

The deflecting device 1 can also be referred to as a conveying device. The direction in which the elongate item 2 is delivered or transported in the longitudinal transport is preferably the longitudinal transport direction 21.

The deflecting device 1 is preferably designed to change the direction of conveyance of the elongate item 2. The direction of conveyance is especially preferably the direction in which the elongate item 2 is conveyed or transported.

A provision can be preferably made that the direction of conveyance of the deflecting device 1 differs on the input side and the output side.

Preferably, the direction of conveyance of the deflecting device 1 on the input side is orthogonal to the longitudinal extent of the deflecting device 1.

Especially preferably, the direction of conveyance of the deflecting device 1 on the input side is orthogonal to the longitudinal extent of the elongate item 2.

Preferably, the direction of conveyance of the deflecting device 1 on the output side is in the longitudinal transport direction 21 of the deflecting device 1.

A provision is made that the deflecting device 1 has a receiving region 3. The receiving region 3 is preferably designed to accommodate the elongate item 2. The elongate item 2 is preferably transferred by a cross transporter from the cross transport into the receiving region 3. Since the concept of a cross transporter is known to those skilled in the art, the listing and description of various cross transporters will be omitted here.

In particular, the elongate item 2 is received on the input side by a feeder in the cross transport.

In particular, the feeder can be a cross transporter.

The self-weight of the elongate item 2 and the acceleration due to gravity are preferably exploited in order to transfer the elongate item 2 from the cross transport to the longitudinal transport.

Especially preferably, the receiving region 3 is designed to be open toward the top when the deflecting device 1 is in the operating state. The receiving region 3 of the deflecting device 1 is preferably an opening, which opening is arranged so as to face away from the ground when the deflecting device 1 is in the operating state.

In designating the receiving region 3 as a receiving space, a provision is preferably made that the receiving space is not a closed space. The receiving space is preferably designed to be open at the top when the deflecting device 1 is in the operating state.

FIG. 2 shows an example of the preferred embodiment of the deflecting device 1 with an elongate item 2 that has been received in the receiving region 3 of the deflecting device 1.

The deflecting device 1 preferably has a first and a second end region 8, 9, the elongate item 2 being transferred to the longitudinal transport, in particular to a conveyor system for the longitudinal transport of an elongate item 2 at the first end region 8 of the deflecting device 1, and the second end region 9 of the deflecting device 1 being arranged opposite and at a distance from the first end region 8 of the deflecting device 1. FIG. 1 shows an example of the preferred embodiment of the deflecting device 1 with the first and second end regions 8, 9.

The deflecting device 1 preferably has a top side 10 on which top side 10 the elongate item 2 is transported.

The deflecting device 1 preferably has an underside 11 which is arranged opposite and at a distance from the top side 10 of the deflecting device 1.

The deflecting device 1 preferably has a first and a second transverse side 12, 13, it being possible for the elongate item 2 to be received on the input side in the cross transport on the first and/or on the second transverse side 12, 13.

FIG. 2 shows an example of the preferred embodiment of the deflecting device 1 with the top side 10, the underside 11, and the first and second transverse sides 12, 13.

A provision is made that the at least two belt-type conveyors 4, 5 span the receiving region 3 when the deflecting device 1 is in an operating state.

In particular, a provision can be made that the direction of conveyance of the belt-type conveyors 4, 5 is arranged in the longitudinal transport direction 21.

In particular, belt-type conveyors can be regarded as conveyors which comprise movable conveying surfaces in the longitudinal transport direction 21.

In particular, a provision can be made that the elongate item 2 is transported on the conveying surfaces that are movable in the longitudinal transport direction 21.

The belt-type conveyors 4, 5 can be preferably mechanical conveyors.

Especially preferably, the belt-type conveyors 4, 5 can be belt conveyors and/or chain conveyors.

In particular, the belt-type conveyors 4, 5 can comprise conveyor belts for transporting the elongate item 2.

In particular, the belt-type conveyors 4, 5 can comprise conveyor chains for transporting the elongate item 2. The elongate item 2 is preferably transported or conveyed with the at least two belt-type conveyors 4, 5.

The at least two belt-type conveyors 4, 5 preferably have the same conveyor width.

Alternatively, a provision can be made that the at least two belt-type conveyors 4, 5 have different conveyor widths.

The at least two belt-type conveyors 4, 5 preferably comprise at least one drive unit. Preferably, the at least two belt-type conveyors 4, 5 each comprise at least one drive unit. In particular, a provision is made that the at least two belt-type conveyors 4, 5 are driven by the at least one drive unit.

Preferably, the at least one drive unit can comprise at least one motor, in particular an electric motor, for driving the at least two belt-type conveyors 4, 5.

Preferably, the at least one drive unit can comprise at least one gear motor for driving the at least two belt-type conveyors 4, 5.

A provision can be especially preferably made that the belt-type conveyors 4.5 move substantially at the same speed.

In designing the at least two belt-type conveyors 4, 5 as belt conveyors, a provision can be made that the at least one drive unit of the at least two belt-type conveyors 4, 5 comprises a roller unit for guiding the at least two belt-type conveyors 4, 5 along the longitudinal transport direction 21.

A provision can be preferably made that the deflecting device 1 comprises exactly two belt-type conveyors 4, 5 which are arranged at an angle relative to one another. Especially preferably, a provision can be made that the deflecting device 1 comprises exactly two belt-type conveyors 4, 5 which are arranged at a predefined angle relative to one another. FIGS. 1 to 3 show an example of the preferred embodiment of the deflecting device 1 with two belt-type conveyors 4, 5.

The operating state of the deflecting device 1 is preferably a state in which an elongate item 2 is received on the input side in the cross transport by means of the deflecting device 1 and delivered on the output side in the longitudinal transport.

The receiving region 3 is preferably formed by the at least two belt-type conveyors 4, 5.

Especially preferably, a provision can be made that the at least two belt-type conveyors 4, 5 comprise at least one damper. Preferably, the at least one damper is designed to dampen an impact of the elongate item 2 on the at least two belt-type conveyors 4, 5. This provides the advantage of enabling the elongate item 2 to be accelerated more quickly in the longitudinal transport direction 21.

In particular, the at least one damper can be formed by the at least two belt-type conveyors 4, 5 themselves.

In particular, the at least one damper can be formed in the roller unit of the at least two belt-type conveyors 4, 5. A provision can be preferably made that the roller unit comprises at least one hydraulic damper and/or at least one friction damper.

A provision can be preferably made that at least one conveyor wheel 14 is arranged on the first and/or second transverse side 12, 13 of the deflecting device 1 for the purpose of accelerating the elongate item 2 along the direction of conveyance.

Especially preferably, the first and/or the second transverse side 12, 13 of the deflecting device 1 is designed to accept the elongate item 2 on the input side in the cross transport.

The deflecting device 1 preferably comprises a plurality of conveyor wheels 14 along the longitudinal transport direction 21 for the purpose of accelerating the elongate item 2 along the direction of conveyance.

Preferably, the at least one conveyor wheel 14 can be designed to accelerate the elongate item 2 along the direction of conveyance.

Especially preferably, the at least one conveyor wheel 14 can be helically and/or conically shaped.

Especially preferably, the at least one conveyor wheel 14 can be designed to accelerate the elongate item 2 along the direction of conveyance before contact with the at least two belt-type conveyors 4, 5.

After the receiving region 3 of the deflecting device 1 receives the elongate item 2 on the input side in the cross transport and there is substantially no longitudinal acceleration of the elongate item 2 during the cross transport of the elongate item 2, the acceleration of the elongate item 2 by means of the at least one conveyor wheel 14 results in an acceleration of the elongate item 2 in the longitudinal transport direction 21 upon transfer of the elongate item 2 from the cross transport to the longitudinal transport.

A provision can be preferably made that at least one conveyor wheel 14 is arranged on the first and/or second transverse side 12, 13 of the deflecting device 1 for the purpose of accelerating the elongate item 2 in the longitudinal transport direction 21.

When the elongate item 2 is received on the input side, the elongate item 2 is preferably accelerated in the longitudinal transport direction 21 by means of the at least one conveyor wheel 14. The elongate item 2 is preferably accelerated in the longitudinal transport direction 21 before the elongate item 2 comes into contact with at least one of the at least two belt-type conveyors 4, 5.

A provision can be preferably made that a V-shaped profile of the receiving region 3 is spanned by the at least two belt-type conveyors 4, 5. This provides the advantage that a particularly low-slip longitudinal acceleration of the elongate item 2 is achieved when the elongate item 2 is transferred from the cross transport to the longitudinal transport. Furthermore, this also provides the advantage that, especially with shorter, elongate items 2, there is no pendulum movement when the elongate item 2 is received into the receiving region 3.

The V-shaped profile of the receiving region 3 is preferably formed by the at least two belt-type conveyors 4, 5.

Especially preferably, the V-shaped profile of the receiving region 3 can be open toward the top when the deflecting device 1 is in the operating state.

A provision can be preferably made that the receiving region 3 is delimited only by the at least two belt-type conveyors 4, 5. This provides the advantage that the elongate item 2 can be received particularly well by the receiving region 3, it being possible for the elongate item 2 to come into contact especially quickly with a larger area of the at least two belt-type conveyors 4, 5.

Especially preferably, a provision can be made that the receiving region 3 is delimited downward by the at least two belt-type conveyors 4, 5 when the deflecting device 1 is in the operating state.

A provision can be especially preferably made that the receiving region 3 is delimited exclusively by the at least two belt-type conveyors 4, 5.

A provision can be preferably made that the at least two belt-type conveyors 4, 5 are arranged relative to one another at an angle of greater than or equal to 60 degrees, preferably greater than or equal to 80 degrees, especially preferably greater than or equal to 100 degrees. This provides the advantage that the elongate item 2 can be received particularly efficiently by the receiving region 3, whereby a particularly rapid centering of the elongate item 2 is achieved and whereby longitudinal acceleration with minimal slippage is achieved.

A provision can be preferably made that the at least two belt-type conveyors 4, 5 are arranged relative to one another at an angle of less than or equal to 180 degrees, preferably less than or equal to 160 degrees, especially preferably less than or equal to 140 degrees. This provides the advantage that the elongate item 2 can be received particularly efficiently by the receiving region 3, whereby a particularly rapid centering of the elongate item 2 is achieved and whereby longitudinal acceleration with minimal slippage is achieved.

A provision can be preferably made that the at least two belt-type conveyors 4, 5 are arranged relative to one another at an angle of substantially 110 degrees. This provides the advantage that the elongate item 2 can be received particularly efficiently by the receiving region 3, whereby a particularly rapid centering of the elongate item 2 is achieved and whereby a particularly good longitudinal acceleration with minimal slippage is achieved.

In particular, the angle at which the two belt-type conveyors 4, 5 are arranged to one another is the angle which, on a plane perpendicular to the longitudinal transport direction 21 when the deflecting device 1 is in the operating state, is formed by a first tangent on a first surface of the at least two belt-type conveyors 4, 5 and a second tangent is enclosed on a second surface of the at least two belt-type conveyors 4.5.

A provision can be preferably made that the at least two belt-type conveyors 4, 5 are locked when the deflecting device 1 is in the operating state, with at least one belt-type conveyor from among the at least two belt-type conveyors 4, 5 being pivotable into a maintenance position when the deflecting device 1 is in a maintenance state. This provides the advantage that maintenance work on the at least two belt-type conveyors 4, 5 or the maintenance of the deflecting device 1 is significantly simplified compared to currently known deflecting devices 1 and can be carried out more quickly.

A provision can be preferably made that the deflecting device 1 comprises at least one joint.

A provision can be preferably made that at least one first belt-type conveyor 4 from among the at least two belt-type conveyors 4, 5 is attached to at least one first fastening arm 6. This provides the advantage that maintenance and maintenance work on the at least two belt-type conveyors 4, 5 or the maintenance of the deflecting device 1 is significantly simplified compared to currently known deflecting devices 1.

A provision can be preferably made that at least one second belt-type conveyor 5 from among the at least two belt-type conveyors 4, 5 is attached to at least one second fastening arm 7.

A provision can be preferably made that the at least two belt-type conveyors 4, 5 are locked when the deflecting device 1 is in the operating state, with the first belt-type conveyor 4 and/or the second belt-type conveyor 5 from among the at least two belt-type conveyors 4, 5 being pivotable into a maintenance position when the deflecting device 1 is in a maintenance state.

A provision can be preferably made that the at least one first fastening arm 6 is mounted so as to pivot relative to at least one second belt-type conveyor 5 from among the at least two belt-type conveyors 4, 5 for the purpose of pivoting out into the maintenance position of the deflecting device 1. This provides the advantage that maintenance and maintenance work on the at least two belt-type conveyors 4, 5 or the maintenance of the deflecting device 1 is significantly simplified compared to currently known deflecting devices 1.

Especially preferably, the at least one first fastening arm 6 can be pivoted relative to the at least one second fastening arm 7, in particular by means of the at least one joint.

Especially preferably, a provision can be made that the deflecting device 1 comprises at least one hydraulic unit 15 for pivoting the at least one first fastening arm 6 into the maintenance position of the deflecting device 1.

In particular, the at least one hydraulic unit 15 can be arranged at the first end region 8 and/or at the second end region 9 of the deflecting device 1.

In particular, the at least one hydraulic unit 15 can be arranged on the at least one drive unit of the at least two belt-type conveyors 4, 5.

A provision can be especially preferably made that the two belt-type conveyors 4, 5 support each other at least indirectly. FIG. 2 shows a preferred embodiment of the deflecting device 1 in a front view in which it can be seen that the two belt-type conveyors 4, 5 are at least indirectly supported.

A provision can be preferably made that the at least two fastening arms 6, 7 are mounted so as to pivot, in particular at the at least one joint, about an angle of less than 100 degrees, preferably about an angle of less than 80 degrees, especially preferably about an angle of less than 60 degrees. This provides the advantage that the parts of the deflecting device 1 are more accessible, facilitating maintenance work on the deflecting device 1.

A provision can be preferably made that the at least two fastening arms 6, 7 are mounted to as to pivot, in particular at the at least one joint, about an angle of greater than 10 degrees, preferably about an angle of greater than 20 degrees, especially preferably about an angle of greater than 30 degrees. This provides the advantage that the parts of the deflecting device 1 are more accessible, facilitating maintenance work on the deflecting device 1.

A provision can be preferably made that the at least two fastening arms 6, 7 are mounted to as to pivot, in particular at the at least one joint, about an angle of substantially 35 degrees. This provides the advantage that the parts of the deflecting device 1 are particularly easily accessible, facilitating maintenance work on the deflecting device 1 in particular.

A provision can be preferably made that the at least one joint comprises an axis which is arranged parallel to the direction of conveyance.

A provision can be preferably made that the deflecting device 1 is part of a sorting system.

A sorting system is a system that is intended to sort various elongate items 2 according to specified criteria.

Preferably, unsorted elongate items 2 are received by the sorting system on the input side and sorted and delivered on the output side.

The elongate item 2 is preferably received by the sorting system on the input side in the cross transport.

The elongate item 2 is preferably sorted by the sorting system in the longitudinal transport.

At least parts of the sorting system are shown by way of example in FIGS. 1 to 6, although the overall sorting system is not shown in FIGS. 1 to 6.

The elongate item 2 that is deflected by means of a deflecting device 1 is preferably delivered on the output side to a conveyor system of the sorting system.

The sorting system can preferably comprise a conveyor system 16 for the longitudinal transport of an elongate item 2 in order to transport unsorted elongate items 2 in the longitudinal transport direction 21.

The elongate item 2 can be preferably delivered from the deflecting device 1 to the conveyor system 16 on the output side.

Furthermore, the sorting system can preferably comprise at least one storage unit 31, with the sorted items being preferably stored in the at least one storage unit 31.

In particular, a provision can be made that the sorted items are stored in a plurality of storage units 31. A provision can be preferably made that the storage units 31 differ in their longitudinal extent.

In particular, a provision can be made that the storage unit 31 is designed such that the length of the elongate item 2 corresponds to the length of the at least one storage unit 31.

The storage unit 31 can be preferably arranged next to the conveyor system 1 in the longitudinal transport direction 7.

Figure 4:
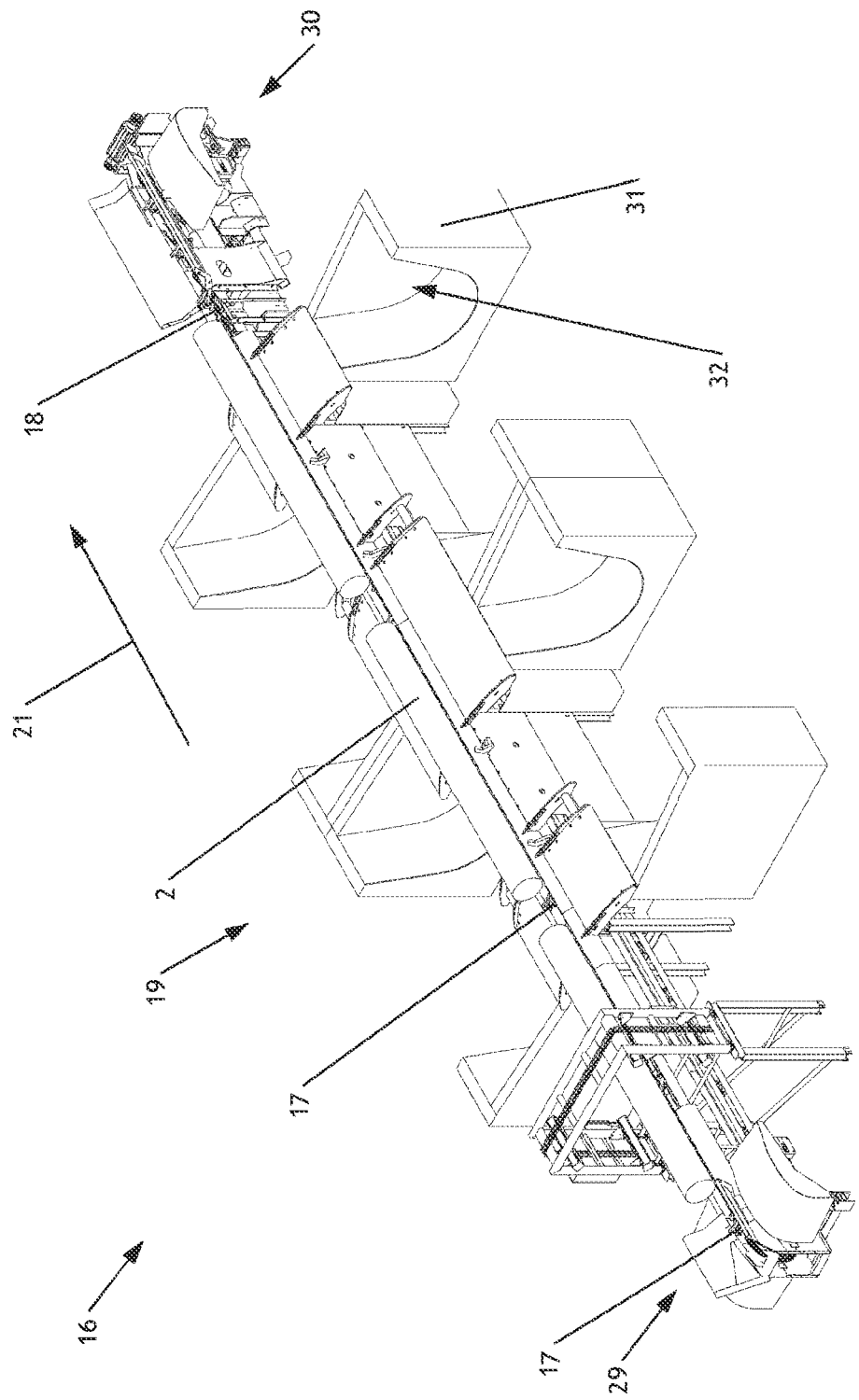
FIG. 4 shows an axonometric representation of a preferred embodiment of a conveyor system of a sorting system for the longitudinal transport of an elongate item.
Figure 5:
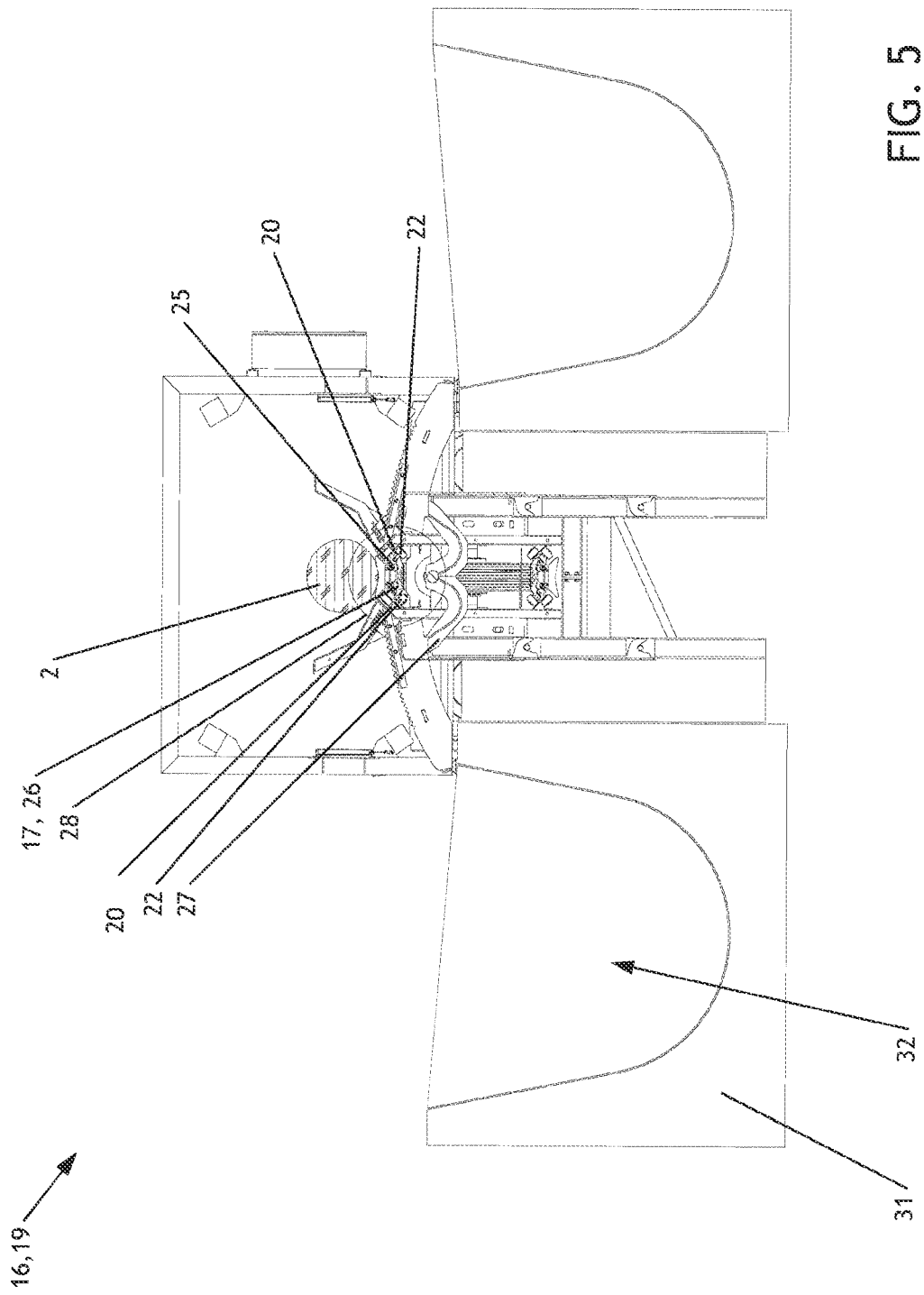
FIG. 5 shows a section perpendicular to the longitudinal transport direction of the preferred embodiment of the conveyor system of the sorting system.

Especially preferably, the at least one storage unit 31 can have an item receiving opening 32. In particular, a provision can be made that an end region of the elongate items 2 is arranged in the item receiving opening 32. In FIGS. 4 and 5, the storage unit 31 and the item receiving unit 31 of the sorting system can be seen in the preferred embodiment of the conveyor system 1.

A provision can be preferably made that the deflecting device 1 delivers the elongate item 2 to a conveyor system 16 on the output side, that the conveyor system 16 for the longitudinal transport of an elongate item 2 comprises a multiplicity of movably mounted drivers 17, that the multiplicity of drivers 17 are connected to a circulating traction belt by means of at least one traction cable 18, that the conveyor system 16 comprises at least one guide rail 20 in the longitudinal transport direction 21 in a conveying region 19, that each driver 17 comprises at least one roller 22 for guiding the driver 17 along the at least one guide rail 20, and that each driver 17 in the conveying region 19 is mounted in a tilt-proof manner on the at least one guide rail 20.

This provides the advantage that the conveyor system 16 can be operated in an environmentally friendly manner, since no oil lubrication is required for the longitudinal conveyance of elongate items 2. This means that the use of a chain as a drivetrain for the multiplicity of drivers 17 can be dispensed with, and by combining the at least one traction cable 18 with the at least one roller 22 of the driver 17, oil lubrication on exposed parts of the conveyor system 16 can be completely dispensed with. This means that no oil can get into the environment at the installation site of the conveyor system 16. Furthermore, the combination of the at least one traction cable 18 with the at least one roller 22 of the driver 17 also significantly reduces the noise pollution of the conveyor system 16 during a conveying process as opposed to a conveyor system 16 with a chain-guided driver 17, resulting in a significant reduction in noise pollution for residents and workers who live or work near such a sorting system. By guiding the multiplicity of drivers 17 along the at least one guide rail 20 with the aid of the at least one roller 22, the friction of the driver 17 on the at least one guide rail 20 is significantly reduced compared to currently known conveyor systems 16, thereby increasing the service life of the conveyor system 16 compared to currently known conveyor systems 16 and enabling maintenance intervals to be increased. By virtue of the reduced friction on moving parts of the conveyor system 16, the energy consumption of the conveyor system 16 is consequently also reduced, enabling elongate items 2 to be conveyed in a more environmentally friendly manner than with conventional conveyor systems 16. The combination of the at least one traction cable 18 with the at least one roller 22 results in another synergistic effect that makes the maintenance and construction of the conveyor system 16 significantly easier. As a result, parts of the conveyor system 16 can even already be built into a delivery unit in a production plant, which advantageously also makes it easier to exchange parts of the conveyor system 16 compared to chain-operated conveyor systems 16. Due to the tilt-proof mounting of each driver 17 in the conveying region 19 on the at least one guide rail 20, a more efficient and safe operation of the conveyor system 16 is achieved along with, at the same time, a high conveying capacity.

It has been found that the sorting system can be operated especially advantageously if the deflecting device 1 is combined with the conveyor system 16. The combination of the conveyor system 16 with the deflecting device 1 results in synergistic effects that make it possible for the elongate item to be delivered to the conveyor system 16 in an especially precise and efficient manner after the elongate item 2 has been diverted from the cross transport to the longitudinal transport. As a result, the elongate item 2 can be received particularly well by the conveyor system 16, ensuring a quick and precise transfer of the elongate item 2 to the drivers 17 of the conveyor system 16.

In principle, the conveyor system 16 could also be operated with a deflecting device 1 other than that described herein.

The conveyor system 16 is preferably designed to convey the elongate item 2 efficiently and in an environmentally friendly manner in longitudinal transport.

Figure 6:
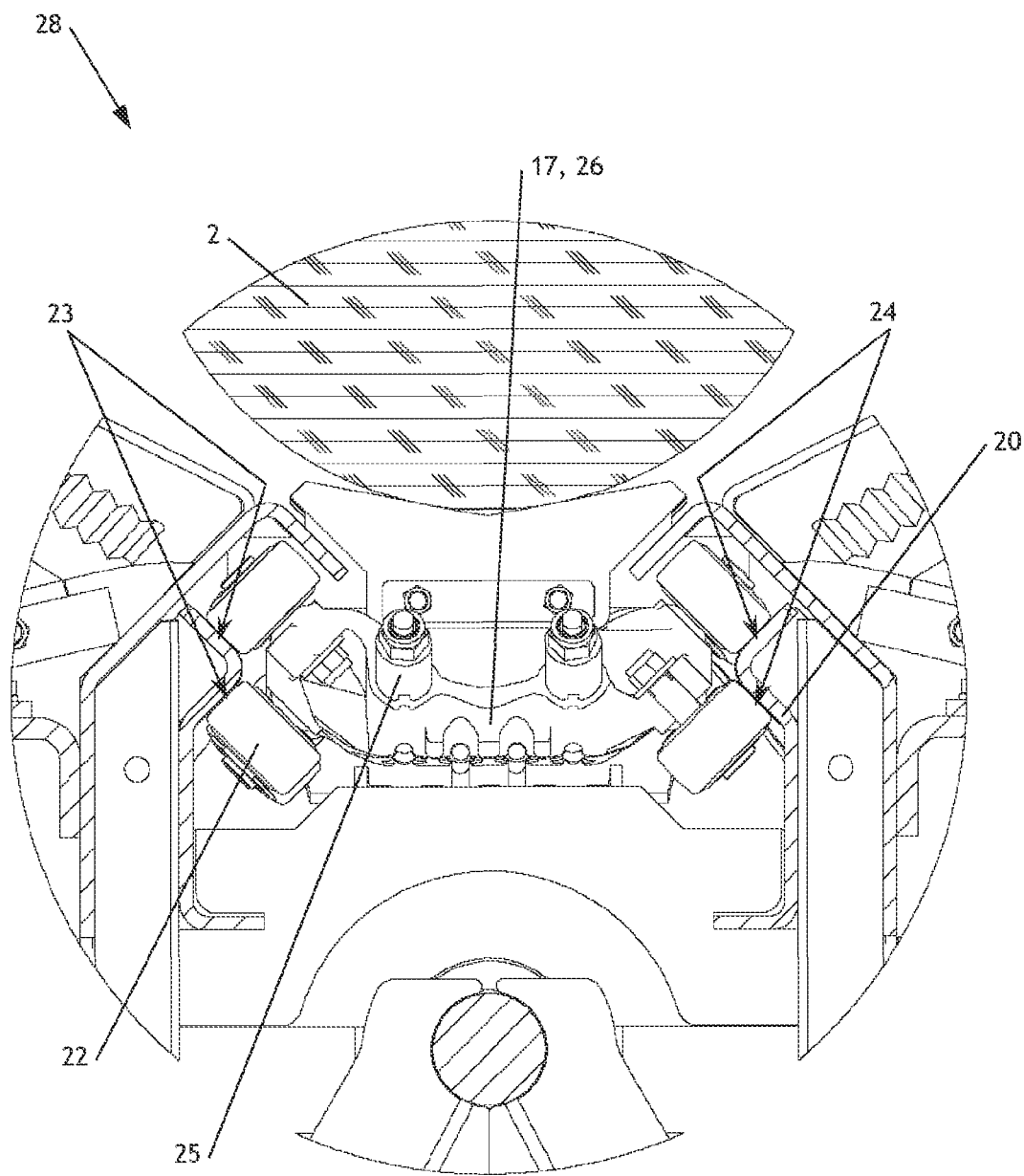
FIG. 6 shows detail of the preferred embodiment of the conveyor system of the sorting system for the longitudinal transport of an elongate item.

FIGS. 4 to 6 show at least parts of a preferred embodiment of a conveyor system 16 for the longitudinal transport of an elongate item 2 by means of a multiplicity of movably mounted drivers 17, the multiplicity of drivers 17 being connected to a circulating traction belt by means of at least one traction cable 18, the conveyor system 16 comprising, in a conveying region 19, at least one guide rail 20 in the longitudinal transport direction 21, each driver 17 comprising at least one roller 22 for guiding the driver 17 along the at least one guide rail 20, and each driver 17 in the conveying region 19 being mounted in a tilt-proof manner on the at least one guide rail 20.

The conveyor system 16 is a device that is designed to transport an elongate item 2 in the longitudinal transport direction 21.

A provision is made that the elongate item 2 is transported in the longitudinal transport direction 21 by means of a multiplicity of movably mounted drivers 17.

In particular, the longitudinal transport direction 21 is the direction along which the elongate item 2 is conveyed or transported. Especially preferably, the longitudinal transport direction 21 can also be referred to as the conveying transport direction.

The elongate item 2 preferably rests on at least two drivers 17 in the conveying region 19.

Preferably, at least a portion of the multiplicity of movably mounted drivers 17 has six sides, an upper side of the driver 17 being connected to a support unit for the at least one piece of wood, an underside of the driver 17 being arranged opposite and at a distance from the top of the driver 17, a front side of the driver 17 being arranged in the longitudinal transport direction 21, a rear side of the driver 17 being arranged opposite and at a distance from the front side of the driver 17, and a narrow side of the driver 17 being arranged orthogonally to the longitudinal transport direction 21.

A provision can be preferably made that a first end face of the driver 17 is arranged on the front side of the driver 17.

A provision can be preferably made that a second end face of the driver 17 is arranged on the rear side of the driver 17.

The movably mounted drivers 17 are connected to a circulating traction belt by means of at least one traction cable 18. A provision is made that the circumferential traction belt is formed by the drivers 17 connected to the at least one traction cable 18.

The circulating traction belt is preferably closed.

Especially preferably, a provision can be made that at least two drivers 17 of the multiplicity of drivers 17 are connected to one another by means of at least one traction cable 18. Especially preferably, a provision can be made that at least two drivers 17 of the multiplicity of drivers 17 are connected to one another by means of at least two traction cables 18. Especially preferably, a provision can be made that at least two drivers 17 are connected to one another by means of only two traction cables 18.

Especially preferably, a provision can be made that each driver 17 is connected to at least one traction cable 18.

In particular, a provision can be made that each driver 17 is connected to at least two other drivers 17.

A provision can be preferably made that the distance between two drivers 17 is determined by the length of the at least one traction cable 18 between two drivers 17.

Especially preferably, the distance between at least some of the multiplicity of movably mounted drivers 17 can be equal. In particular, the distance between all movably mounted drivers 17 can be equal. This provides the advantage that the distance between the movably mounted drivers 17 can be individually adjusted for each conveyor system 16, making it possible to take the lengths of the elongate item 2 to be transported into account individually on different conveyor systems 16.

A provision can be preferably made that, when the conveyor system 16 is in the operating state, the at least one traction cable 18 in the conveying region 19 is under tension and/or is tensioned.

Especially preferably, the at least one traction cable 18 can be formed by means of a cross lay of the cable. The cross lay of the cable can also be referred to as a counter lay.

Alternatively, the at least one traction cable 18 can be formed by means of a Lang lay of the cable.

Especially preferably, a provision can be made that, when the conveyor system 16 is in the operating state, the at least one traction cable 18 is under tension and/or tensioned only in the conveying region 19.

In particular, a provision can be made that the circulating traction belt comprises a return region which is arranged opposite and at a distance from the conveying region 19.

Especially preferably, the return region can be arranged beneath the conveying region 19 when the conveyor system 16 is in the operating state.

A provision can be preferably made that, when the conveyor system 16 is in the operating state, the at least one traction cable 18 is under tension and/or tensioned in the return region.

A provision can be preferably made that the multiplicity of movably mounted drivers 17 are guided in the return region counter to the longitudinal transport direction 21.

In particular, a provision can be made that the conveyor system 16 has a longitudinal extent in the longitudinal transport direction 21, with two transport direction change regions 29, 30 delimiting the conveyor system 16 in its longitudinal extent.

In particular, a provision can be made that a first transport direction change region 29 of the conveyor system 16 is arranged at a first end region of the conveyor system 16 and a second transport direction change region 30 of the conveyor system 16 is arranged at a second end region of the conveyor system 16 which is arranged opposite the first end region of the conveyor system 16. The conveyor system 16 is preferably delimited in its longitudinal extent by the first transport direction change region 29 and/or the second transport direction change region 30. In FIG. 1, the first transport direction change region 29 can be seen at the first end region of the conveyor system 16 and the second transport direction change region 30 at the second end region of the conveyor system 16.

Preferably, the first transport direction change region 29 and the second transport direction change region 30 comprise a first and a second direction-changing device for changing the transport direction of the multiplicity of movably mounted drivers 17 on the at least one traction cable 18 from the conveying region 19 to the return region. Considering a single driver 17 from among the multiplicity of movably mounted drivers 17, the driver 17 is guided along the circulating traction belt in such a way that the driver 17 preferably comes into at least indirect contact with an elongate item 2 at the first end region of the conveyor system 16 after the first direction-changing device 16 in the longitudinal transport direction 21. Subsequently, the elongate item 2 is preferably transported along the at least one guide rail 20 in the conveying region 19 in the longitudinal transport direction 21. A provision can be preferably made that the elongate item 2 is thrown off by the driver 17 during transport in the conveying region 19 of the conveyor system 16. After the elongate item 2 have been transported, the driver 17 is preferably guided by means of the second direction-changing device into the return region in the second transport direction change region 30 at the second end region of the conveyor system 16. Subsequently, the driver 17 is preferably returned counter to the direction of conveyance. As a result, a provision can be preferably made that the driver 17 can be used again to convey an elongate item 2 when the driver 17 is guided into the conveying region 19 by the first direction-changing device.

A provision can be preferably made that the first and/or the second direction changing device is designed to drive the conveyor system 16. In particular, the first and/or the second direction changing device can be designed to drive the circulating traction belt. Preferably, the first and/or the second direction changing device can comprise a motor for driving the conveyor system 16.

In particular, the conveying region 19 can be arranged between the first transport direction change region 29 and the second transport direction change region 30. The elongate item 2 can be preferably transported in the conveying region 19 of the conveyor system 16. The multiplicity of drivers 17 can be preferably transported in the longitudinal transport direction 21 in the conveying region 19.

In particular, the return region can be arranged between the first transport direction change region 29 and the second transport direction change region 30. The multiplicity of drivers 17 can be preferably transported counter to the longitudinal transport direction 21 in the return region.

Preferably, at the first end region of the conveyor system 16, the elongate item 2 can be placed on at least two movably mounted drivers 17 and transported by means of the at least two movably mounted drivers 17 to the second end region of the conveyor system 16. Especially preferably, the elongate item 2 can be placed on the at least two movably mounted drivers 17 with the aid of a deflecting device 1 of a sorting system. Placing the elongate item 2 on the at least two movably mounted drivers 17 can also be preferably understood as a transfer of the elongate item 2 from the deflecting device 1 of the sorting system to the conveyor system 16.

The circulating traction belt preferably comprises the conveying region 19 and the return region, as well as the first transport direction change region 29 and the second transport direction change region 30.

A provision can be made that the conveyor system 16 comprises at least one guide rail 20 in the longitudinal transport direction 21 in the conveying region 19. A provision is preferably made that the conveyor system 16 comprises at least two guide rails 20 in the longitudinal transport direction 21 in the conveying region 19. In particular, a provision can be made that the at least two guide rails 20 of the conveyor system 16 are arranged opposite one another and at a distance from one another.

A provision can be preferably made that the conveyor system 16 comprises at least one guide rail 20 for guiding the driver 17 counter to the longitudinal transport direction 21 in the return region.

Preferably, the at least one guide rail 20 can be made of metal and/or a metal alloy and/or of a polymer, particularly a plastic, and/or of a composite material.

Preferably, the at least one guide rail 20 can be straight.

Preferably, the at least one guide rail 20 can be arranged at least partially in the conveying region 19. Especially preferably, the at least one guide rail 20 extends along the conveying region 19. Especially preferably, the at least one guide rail 20 extends from the first transport direction change region 29 to the second transport direction change region 30 along the longitudinal transport direction 21.

A provision can be made that each driver 17 is guided with at least one roller 22 along the at least one guide rail 20. A provision can be preferably made that at least one roller 22 is guided on each guide rail 20. FIG. 5 shows a section perpendicular to the longitudinal transport direction 21 of the conveyor system 16 shown in FIG. 4, with the at least one roller 22 and the at least one guide rail 20 being visible. FIG. 6 shows detail of the preferred embodiment of the conveyor system 16 denoted by reference numeral 28 in FIG. 5.

The at least one roller 22 can be preferably made of a polymer, particularly of a plastic and/or rubber.

Alternatively, the at least one roller 22 can be made of a metal, in particular a metal alloy.

A provision is made that each driver 17 is mounted in a tilt-proof manner in the conveying region 19 on the at least one guide rail 20.

In particular, a provision can be made that, when the conveyor system 16 is in the operating state, a cover is arranged above the at least one guide rail 20 in the conveying region 19. In particular, a provision can be made that the cover is part of the at least one guide rail 20. When more than at least one guide rail 20 is employed, a provision can be preferably made that a cover is arranged above each guide rail 20 in the conveying region 19. This provides the advantage of enabling the guide rails 20 to be protected from contamination.

A provision can be preferably made that the movably mounted drivers 17 are arranged at a distance from one another. In particular, a provision can be made that the movably mounted drivers 17 are arranged at a predetermined distance from one another. In particular, the distance between the movably mounted drivers 17 can depend on the length of the item 2 to be transported. This provides the advantage that no continuous conveyor belt has to be used to transport or convey the elongate item 2, which makes the cleaning of the conveyor system 16 and the maintenance of the drivers 17 easier.

A provision can be preferably made that the at least one guide rail 20 comprises at least four contact surfaces 23, 24 along the longitudinal transport direction 21, with at least one roller 22 being guided on each contact surface 23, 24 in at least some of the movably mounted drivers 17 in the conveying region 19. This provides the advantage that the multiplicity of movably mounted drivers 17 can be guided in an especially efficient and tilt-proof manner along the at least one guide rail 20.

A provision can be preferably made that the at least four contact surfaces 23, 24 are formed by the at least one guide rail 20.

A provision can be especially preferably made that the at least four contact surfaces 23, 24 are part of the at least one guide rail 20.

Alternatively, a provision can be made that the at least four contact surfaces 23, 24 are indirectly connected to the at least one guide rail 20.

Preferably, a provision can be made that two first contact surfaces 23 of the at least four contact surfaces 23, 24 are arranged opposite and at a distance from two second contact surfaces 24 of the at least four contact surfaces 23, 24. This provides the advantage that the multiplicity of movably mounted drivers 17 can be guided along the at least one guide rail 20 in an especially efficient and tilt-proof manner.

Especially preferably, a provision can be made that the two first contact surfaces 23 of the at least four contact surfaces 23, 24 form a first pair of contact surfaces 23 and that the two second contact surfaces 24 of the at least four contact surfaces 23, 24 form a second pair of contact surfaces 24.

Especially preferably, a provision can be made that the two first contact surfaces 23 or the first pair of contact surfaces 23 are arranged in substantial axial symmetry to the two second contact surfaces 24 or to the second pair of contact surfaces 24.

Especially preferably, a provision can be made that the two first contact surfaces 23 or the first pair of contact surfaces 23 are arranged opposite the two second contact surfaces 24 or the second pair of contact surfaces 24.

A provision can be preferably made that the two first contact surfaces 23 and/or the two second contact surfaces 24 of the at least four contact surfaces 23, 24 are arranged at an angle relative to one another on the at least one guide rail 20. This provides the advantage of enabling the driver 17 to be guided in an especially tilt-proof manner along the at least one guide rail 20 in the conveying region 19.

FIG. 6 shows an example of the preferred embodiment of the conveyor system 16 with two first contact surfaces 23 and two second contact surfaces 24, the two first contact surfaces 23 being arranged at a first angle relative to one another on a first guide rail, the two second contact surfaces 24 being arranged at a second angle relative to one another on a second guide rail, and the angular width of the first angle corresponding to the angular width of the second angle.

A provision can be preferably made that the angle between the two first contact surfaces 23 corresponds to the angle between the two second contact surfaces 24.

A provision can be preferably made that the two first contact surfaces 23 form a first wedge as a result of the angle between the two first contact surfaces 23. A provision can be preferably made that the two second contact surfaces 24 form a second wedge as a result of the angle between the two second contact surfaces 24. Especially preferably, a provision can be made that the tip of the first wedge is arranged opposite and at a distance from the tip of the second wedge.

Especially preferably, a provision can be made that the two first contact surfaces 23 or the first pair of contact surfaces 23 and/or the two second contact surfaces 24 or the second pair of contact surfaces 24 are arranged at an angle less than or equal to 170 degrees to one another on the at least one guide rail 20 in the conveying region 19.

Especially preferably, a provision can be made that the two first contact surfaces 23 or the first pair of contact surfaces 23 and/or the two second contact surfaces 24 or the second pair of contact surfaces 24 are arranged substantially at right angles to one another on the at least one guide rail 20. This provides the advantage that the driver 17 can be guided along the at least one guide rail 20 in the conveying region 19 in an especially tilt-proof manner.

A provision can be preferably made that each driver 17 has at least one connecting device 25 for fastening the at least one traction cable 18. Especially preferably, each driver 17 can be attached to the at least one traction cable 18 via the at least one connecting device 25.

This provides the advantage that, in the event of maintenance on a driver 17, the driver 17 in question can be replaced quickly and easily. FIG. 6 shows a detailed view of the embodiment of the conveyor system 16 shown in FIG. 5, with a driver 17 with two connecting devices 25 for fastening two traction cables 18 being shown.

Especially preferably, the at least one connecting device 25 comprises a clamp connection for connecting the at least one traction cable 18 to the driver 17.

A provision can be preferably made that the at least one connecting device 25 is arranged on at least one end face 26 of the respective driver 17 for at least some of the movably mounted drivers 17. This provides the advantage that the connecting device 25 is especially easy to access in the event of maintenance work, thus enabling repair work on the at least one driver 17 to be carried out with particular ease. Furthermore, an exchange of individual parts of the driver 17 or an exchange of the driver 17 itself can be carried out quickly and easily.

Preferably, a provision can be made that at least two of the multiplicity of movably mounted drivers 17 are connected to the at least one traction cable 18 in such a way that, in the case of a first driver, the connecting device 25 is arranged on a first end face and, in the case of a second driver, the connecting device 25 is arranged on a second end face which faces away from the first end face.

This provides the advantage that an especially stable and tilt-proof structure of the traction belt is achieved, whereby the drivers 17 are protected especially reliably from lateral force when guided along the at least one guide rail 20. In FIGS. 4 to 6, two drivers 17 connected in this manner to the at least one traction cable 18 are not visible. For this reason, the use of a reference numeral for the first driver, the second driver, the first end face, and the second end face has been omitted.

A provision can be preferably made that the conveyor system 16 comprises a throwing device 27 which is designed to throw off the elongate item 2 laterally from the movably mounted drivers 17 in the conveying region 19.

This provides the advantage that the conveyor system 16 can be used to sort the elongate item 2, with different items 2 being able to be discharged by the movably mounted drivers 17 along the conveying region 19.

Especially preferably, a provision can be made that the conveyor system 16 comprises at least one throwing device 27 along the conveying region 19. In particular, a provision is made that two, preferably three, especially preferably four throwing devices 27 are arranged along the conveying region 19.

A provision can be preferably made that the throwing device 27 of the conveyor system 16 is designed to throw off the elongate item 2 on both sides of the conveying region 19. This provides the advantage of making more sorting options available for the elongate item 2 in a sorting process of the conveyor system 16, resulting in multiple options for designing a sorting line.

A provision can be preferably made that the throwing device 27 comprises an pusher element which is designed to throw the elongate item 2 laterally from the movably mounted drivers 17.

Especially preferably, the pusher element can be part of the throwing device 27.

A provision can be preferably made that the throwing device 13 of the conveyor system 1 is embodied as an eccentric pusher and/or as a rotary pusher. This provision can be made particularly if the conveyor system is used as a pre-sorting peak line. A provision can be preferably made that push-off linear units throw off the elongate item from the movably mounted drivers 3.

Especially preferably, the throwing device 27 can be substantially horseshoe-shaped or U-shaped.

Especially preferably, the throwing device 27 can be rotatably mounted along an axis aligned in the longitudinal transport direction 21.

Especially preferably, the throwing device 27 comprises three positions: in a first position, the throwing device 27 is in a neutral position; in a second position, the throwing device 27 throws the elongate item 2 out of the conveying region 19 on a first side from the movably mounted drivers 17; in a third position, the throwing device 27 throws the elongate item 2 out of the conveying region 19 on a second side from the movably mounted drivers 17.

A provision can be preferably made that the conveyor system 16 is part of a sorting system.

The following are principles for understanding and interpreting the present disclosure.

Features are usually introduced with an indefinite article "a, an, one." Unless the context indicates otherwise, "a, an, one" should not be understood as constituting a numeral.

The connecting word "or" is to be interpreted as inclusive and not exclusive. Unless the context indicates otherwise, "A or B" also includes "A and B", where "A" and "B" represent any arbitrary features.

Insofar as not otherwise established by the disclosure of the invention, a feature X and an object Y are differentiated in multiple embodiments by means of an ordinal number such as "first," "second," or "third." In particular, a feature X or object Y with an ordinal number in a claim does not mean that an embodiment of the invention falling under this claim must have an additional feature X or an additional object Y.

The word "substantially" in connection with a numerical value includes a tolerance of ±10% around the specified numerical value, insofar as not otherwise indicated by the context.

For value ranges, the end points are included insofar as not otherwise indicated by the context.

The invention claimed is:

1. A deflecting device for an elongate item, comprising:
    a receiving region configured to receive the elongate item in cross transport on an input side and to discharge the elongate item in longitudinal transport on an output side; and
    at least two belt-type conveyors in a longitudinal transport direction arranged at an angle relative to one another, the at least two belt-type conveyors spanning the receiving region when the deflecting device is in an operating state;
    wherein at least one conveyor wheel is arranged on at least one of a first transverse side and a second transverse side of the deflecting device, the at least one conveyor wheel configured to contact the elongate item and accelerate the elongate item in a direction of conveyance; and
    wherein the elongate item is accelerated in the direction of conveyance by the at least one conveyor wheel upon transfer of the elongate item from cross transport to longitudinal transport.

2. The deflecting device according to claim 1, wherein a V-shaped profile of the receiving region is spanned by the at least two belt-type conveyors.

3. The deflecting device according to claim 1, wherein the receiving region is delimited only by the at least two belt-type conveyors.

4. The deflecting device according to claim 1, wherein the at least two belt-type conveyors are arranged relative to one another at an angle of greater than or equal to 60 degrees.

5. The deflecting device according to claim 4, the angle is greater than or equal to 80 degrees.

6. The deflecting device according to claim 5, the angle is greater than or equal to 100 degrees.

7. The deflecting device according to claim 1, wherein the at least two belt-type conveyors are arranged relative to one another at an angle of less than or equal to 180 degrees.

8. The deflecting device according to claim 7, the angle is less than or equal to 160 degrees.

9. The deflecting device according to claim 8, the angle is less than or equal to 140 degrees.

10. The deflecting device according to claim 1, wherein the at least two belt-type conveyors are arranged relative to one another at an angle of substantially 110 degrees.

11. A deflecting device for an elongate item, comprising:
    a receiving region configured to receive the elongate item in cross transport on an input side and to discharge the elongate item in longitudinal transport on an output side; and
    at least two belt-type conveyors in a longitudinal transport direction arranged at an angle relative to one another, the at least two belt-type conveyors spanning the receiving region when the deflecting device is in an operating state;
    wherein at least one conveyor wheel is arranged on at least one of a first transverse side and a second transverse side of the deflecting device, the at least one conveyor wheel configured to contact the elongate item and accelerate the elongate item in a direction of conveyance; and
    wherein:
    the at least two belt-type conveyors are locked when the deflecting device is in the operating state; and
    at least one belt-type conveyor from among the at least two belt-type conveyors is pivotable into a maintenance position when the deflecting device is in a maintenance state.

12. The deflecting device according to claim 1, wherein at least one first belt-type conveyor from among the at least two belt-type conveyors is attached to at least one first fastening arm.

13. The deflecting device according to claim 12, wherein the at least one first fastening arm is mounted so as to pivot relative to at least one second belt-type conveyor from among the at least two belt-type conveyors for the purpose of pivoting out into the maintenance position of the deflecting device.

14. A sorting system comprising:
    a deflecting device for an elongate item, the deflecting device including:
        a receiving region configured to receive the elongate item in cross transport on an input side and to discharge the elongate item in longitudinal transport on an output side; and
        at least two belt-type conveyors in the longitudinal transport direction which are arranged at an angle relative to one another, the at least two belt-type conveyors spanning the receiving region when the deflecting device is in an operating state;
    wherein at least one conveyor wheel is arranged on at least one of a first transverse side and a second transverse side of the deflecting device, the at least one conveyor wheel configured to contact the elongate item and accelerate the elongate item in a direction of conveyance; and wherein the elongate item is accelerated in the direction of conveyance by the at least one conveyor wheel upon transfer of the elongate item from cross transport to longitudinal transport.

15. The sorting system according to claim 14, wherein:
the deflecting device delivers the elongate item to a conveyor system for the longitudinal transport of the elongate item on an output side;
the conveyor system for the longitudinal transport of the elongate item comprises a multiplicity of movably mounted drivers;
the multiplicity of drivers are connected to a circulating traction belt by at least one traction cable;
the conveyor system comprises at least one guide rail in the longitudinal transport direction in a conveying region;
each driver comprises at least one roller for guiding the driver along the at least one guide rail; and
each driver in the conveying region is mounted in a tilt-proof manner on the at least one guide rail.

16. The deflecting device according to claim 1, wherein a top edge of the at least one conveyor wheel is arranged above a central axis of the elongate item when the elongate item is conveyed by the at least two belt-type conveyors.

17. The sorting system according to claim 14, wherein a top edge of the at least one conveyor wheel is arranged above a central axis of the elongate item when the elongate item is conveyed by the at least two belt-type conveyors.

18. The deflecting device according to claim 1, wherein the at least one conveyor wheel is one of helically shaped and conically shaped.

19. The deflecting device according to claim 1, wherein the at least one conveyor wheel accelerates the elongate item prior to the elongate item contacting the belt type conveyors.

* * * * *